US006549134B2

(12) United States Patent  (10) Patent No.: US 6,549,134 B2
Östling et al.  (45) Date of Patent: Apr. 15, 2003

(54) TEMPERATURE MONITORING DEVICE

(75) Inventors: Sture Östling, Katrineholm (SE); Uno Axelsson, Katrineholm (SE)

(73) Assignee: SKF Mekan AB, Katrineholm (SE)

( * ) Notice: Subject to any disclaimer, the term of this patent is extended or adjusted under 35 U.S.C. 154(b) by 162 days.

(21) Appl. No.: 09/847,276

(22) Filed: May 3, 2001

(65) Prior Publication Data
US 2001/0050617 A1 Dec. 13, 2001

(30) Foreign Application Priority Data
May 3, 2000 (SE) .......................................... 0001625-3

(51) Int. Cl.$^7$ ............................................... G08B 17/00
(52) U.S. Cl. ..................... 340/584; 340/682; 340/691.1
(58) Field of Search ................. 340/584, 682, 340/331, 332, 691.1; 374/183

(56) References Cited

U.S. PATENT DOCUMENTS

| | | | | |
|---|---|---|---|---|
| 3,548,396 A | * | 12/1970 | Roberts | ........................ 340/682 |
| 4,406,169 A | | 9/1983 | Ikeuchi et al. | |
| 4,448,147 A | | 5/1984 | Dewaeghemeire | |
| 5,691,707 A | * | 11/1997 | Smith et al. | ................. 340/682 |
| 6,236,328 B1 | * | 5/2001 | Smith et al. | ................. 340/682 |
| 6,271,761 B1 | * | 8/2001 | Smith et al. | ................. 340/682 |

FOREIGN PATENT DOCUMENTS

| IT | 1 245 077 | 4/1991 |
|---|---|---|
| SE | 513 279 C2 | 8/2000 |

OTHER PUBLICATIONS

Database WPI, Week 200049; Derwent Publications Ltd., London, GB; AN 2000–541874, XP002171303 & SE 513 279 C (SKF), Aug. 14, 2000.

* cited by examiner

Primary Examiner—Thomas J Mullen, Jr.
(74) Attorney, Agent, or Firm—Burns, Doane, Swecker & Mathis, LLP

(57) ABSTRACT

Temperature monitoring device for monitoring or controlling the temperature of an object, and preferably indicating and/or recording abnormal temperature variations of the object includes a housing having a contact portion for contacting the object, a sensing member in heat transferring contact with the contact portion for emitting signals representative of the object temperature, a control device that receives signals from the sensing member and actuates an indicator, a power source connectable to the sensing member, the control device and the indicator, and a switch biased to interrupt the power supply to the sensing member, control device and indicator. A portion of the housing is movable between a first position where the switch interrupts the power supply and a second position in which the housing portion urges the switch to the power supply position.

27 Claims, 1 Drawing Sheet

TEMPERATURE MONITORING DEVICE

Figure 1:
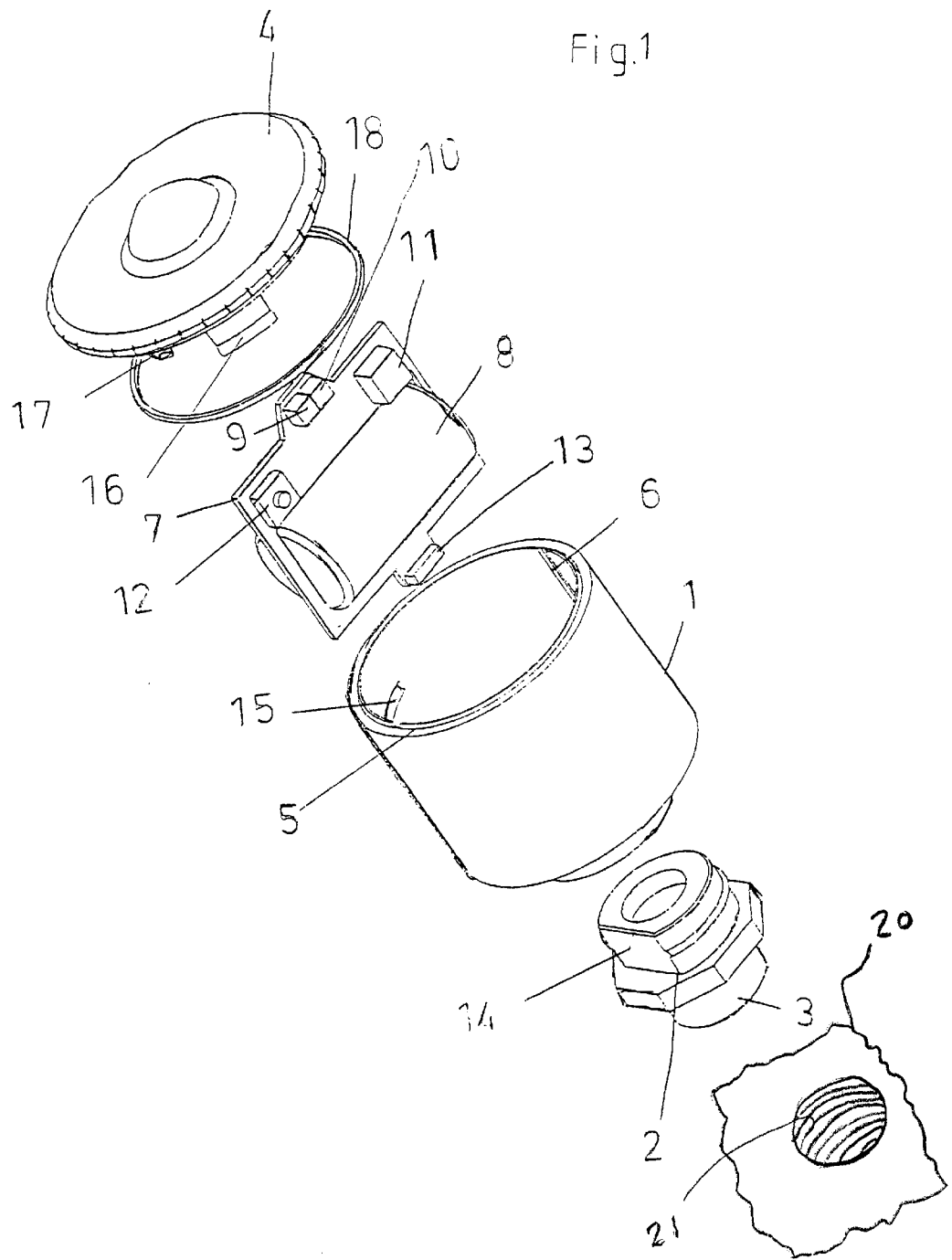

This application is based on and claims priority under 35 U.S.C. § 119 with respect to Swedish Application No. 0001625-3 filed on May 3, 2000, the entire content of which is incorporated herein by reference.

FIELD OF THE INVENTION

The present invention generally relates to a temperature monitoring device. More specifically, the present invention pertains to a temperature monitoring device for controlling the temperature of an object, and for possibly also indicating and/or recording abnormal temperature variations. Although not limited in this regard, the device of the present invention can be to observe the temperature conditions of a bearing in operation.

BACKGROUND OF THE INVENTION

In modern bearing technology, bearings operate best within certain temperature ranges. For different types of bearings and/or different types of bearing applications, this temperature range can vary. During operation, the temperature will vary based on variations in different parameters such as load, speed and amount of lubricant. A rise in the bearing temperature above a certain level can thus provide an indication that there are risks that the bearing assembly may be starting to break down, thus presenting the possibly of causing damage to the machine equipment and/or other components with which the bearing assembly is associated.

Different temperature monitoring devices have been developed over the years, which are often rather complex and expensive, which might incorporate for instance a bimetallic relay, and which following a temperature increase exceeding a certain numeric value, open a valve to permit injection of a small amount of lubricant in the bearing. There are also relatively simple mechanical temperature monitoring devices which, for example, use a spring element having a shape memory effect to visually indicate that the temperature has passed a certain critical temperature level. A significant problem associated with such earlier known temperature monitoring devices, such as those disclosed in U.S. Pat. No. 4,448,147, is that they must be carefully calibrated before use. Also, these devices usually also have an ability to react only when a certain numerical temperature value has been exceeded, but are not sensitive to temperature variations over large ranges insofar as such ranges do not overlap the specified temperature value.

A need thus exists for a temperature monitoring device which is relatively simple in design and relatively easy to install, while at the same time bing quite efficient.

SUMMARY OF THE INVENTION

According to one aspect of the invention, a temperature monitoring device for continuously monitoring the temperature of an object includes a housing having contact means engageable with the object for producing heat transferring contact with the object, indicating means for outputting an indication of a temperature condition of the object, a sensing member positioned in heat transferring contact with the contact means to emit a signal representative of a current temperature of the object, and a control device connected to the sensing member to receive the signal from the sensing member representative of the current temperature of the object and to emit a signal to the indicating means to output the indication of the temperature condition of the object. A power supply means supplies power to the control device, the sensing member and the indicating means, and a switch means is urged to a first condition interrupting the supply of power from the power supply means to the control device, the sensing member and the indicating means, and is movable into a second condition causing the power supply means to supply power to the control device, the sensing member and the indicating means. A portion of the housing is movable between a first position in which the switch means is urged to the first condition and a second position in which the portion of the housing contacts the switch means to cause the power supply means to supply power to the control device, the sensing member and the indicating means.

According to another aspect of the invention, a temperature monitoring device for continuously monitoring the temperature of an object includes a housing adapted to be connected to the object, a sensing member sensing a current temperature of the object by way of heat transfer when the housing is connected to the object and emitting a signal representative of the current temperature of the object, an indicator mounted on the housing for outputting an indication of a temperature condition of the object, a processor connected to the sensing member to receive the signal from the sensing member representative of the current temperature of the object and to emit a signal to the indicating means to output the indication of the temperature condition of the object, and a power supply that supplies power to the processor, the sensing member and the indicator. A switch is changeable between a first condition in which power from the power supply to the processor, the sensing member and the indicating means is interrupted, and a second condition in which power is supplied from the power supply to the processor, the sensing member and the indicating means. A mechanism is provided for changing the switch between the first condition and the second condition.

In accordance with a further aspect of the invention, a temperature monitoring device for continuously monitoring the temperature of an object includes a housing adapted to be removably connected to the object and having a contact portion to contact the object in a heat transfer manner, a sensing member mounted on the housing in heat transferring contact with the contact portion of the housing to sense a current temperature of the object by way of heat transfer when the housing is connected to the object and emitting a signal representative of the current temperature of the object, an indicator mounted on the housing which produces an output indicating a temperature condition of the object, and a processor connected to the sensing member and the indicating means to receive the signal from the sensing member representative of the current temperature of the object and to emit a signal to the indicating means causing the indicating means to produce at least a first output indicating the temperature condition of the object. The processor determines a normal operating condition temperature of the object when a steady-state temperature of the object sensed by the sensing member has been reached and determines an abnormal operating condition temperature of the object when the temperature of the object sensed by the sensing member is outside a predetermined range from the normal operating condition temperature. The processor emits a signal to the indicator upon determining the abnormal operating condition temperature of the object so that the indicator produces the first output indicating the abnormal operating condition temperature of the object. In addition, a power supply supplies power to the processor, the sensing member and the indicator.

BRIEF DESCRIPTION OF THE DRAWING FIGURE

The foregoing and additional features and characteristics of the present invention will become more apparent from the following detailed description considered with reference to the accompanying FIG. 1 which is an exploded perspective view of the temperature monitoring device of the present invention.

DETAILED DESCRIPTION OF THE INVENTION

The temperature monitoring device of the present invention as shown in FIG. 1 includes an elongated rod-like housing 1. A fitting 2 is adapted to be connected to one axial end of the housing. The fitting 2, which forms a contact portion of the housing, includes a threaded portion 3 for attachment of the fitting and the overall device to a threaded bore in the object that is to be supervised or monitored. The opposite axial end of the housing 1 carries a cover 4. This cover 4 is provided with at least one transparent portion. The transparent portion can be in the form of one or more transparent windows provided in the cover or can be in the form of the cover itself being made of transparent material.

As can be seen from FIG. 1, the housing 1 is in the form of a substantially cylindrically-shaped tube. The axial end of the housing that is opposite the end carrying the fitting 2 is provided with a socket or open end 5. The housing includes a cover 4 that is adapted to be received in the socket or open end 5 of the housing. The inner surface of the housing is provided with two diametrically opposed longitudinal grooves 6 extending through the interior of the housing. A removable frame 7 is adapted to be inserted into the interior of the housing, with the side edges of the frame 7 guided in the grooves 6 in the housing.

The frame 7 supports a power supply 8, an indicator 9, 10, a control device 11, a switch member 12 and a sensor member 13. In the illustrated embodiment of the invention, the power supply 8 is the form of a battery, the indicators 9, 10 are constituted by light emitting diodes (e.g., two differently colored light emitting diodes, such as one green and one red), the control device 11 is in the form of a processor, and the sensor member 13 is constituted by a thermistor. The thermistor 13 is formed as a limb or arm projecting from the frame 7. The thermistor 13 and the switch member 12 are thus rigidly interconnected by virtue of being mounted on a common frame along with the battery 8, the light emitting diodes 9, 10, and the processor 11. The power supply or battery 8 can be connected, by way of the switch member 12, to the thermistor 13, the processor 11 and the light emitting diodes 9, 10 via conduits printed on the frame.

When the frame 7 is fully inserted into the housing 1, the light emitting diodes 9, 10 are positioned just inside the cover 4 so that they can be seen from outside the housing through the transparent portion of the cover 4 (i.e., through the transparent window(s) or through the cover itself when the cover is made of transparent material). With the frame 7 positioned in the interior of the housing, the battery 8, the processor 11, the switch member 12 and the thermistor 13 will be situated inside the housing 1 to thereby be protected and enclosed by the surrounding housing.

The fitting 2 has a bar-shaped portion 14 extending axially in a direction away from the threaded portion 3 of the fitting. This bar-shaped portion 14 has a non-round shape to define a generally flat surface portion, and is arranged to be received in a correspondingly shaped non-round cavity in the end of the housing 1.

The interior of the housing 1 is further provided with two diametrically opposed and circumferentially extending short grooves 15 (only one of which is visible in the drawing FIGURE). The grooves 15 thus extend over only a short inner circumferential portion of the housing interior. In the illustrated embodiment, the two grooves are positioned at locations displaced about 90' in relation to the internal grooves 6 in the housing.

When the device thus described is mounted, the frame 7, including the battery 8, the light emitting diodes 9, 10, the processor 11 and the switch member 12, is pushed into the housing 1, with the edges of the frame 7 being received in and guided by the internal longitudinally extending grooves 6 of the housing. As mentioned above, with the frame 7 mounted in the housing, the light emitting diodes 9, 10 are located inside the transparent portion of the cover 4. When the frame 7 is in its completely inserted position in the housing 1, the thermistor 13 is in heat transferring engagement or contact with the bar shaped or flat surface portion 14 of the fitting 2.

The side of the cover 4 facing the housing 1 is provided with axially extending shoulders 16, only one of which is visible in the drawing. These shoulders are arranged to be guided in the grooves 15 in the interior of the housing so that the cover 4, when in position, can be rotated a short distance. The cover 4 also has an axially extending internal knob 17. This knob 17 is positioned so that at one rotational position of the cover 4 the knob 17 presses the switch 12 on the frame to thereby connect the thermistor 13, the processor 11 and the light emitting diodes 9, 10 with the power supply (i.e., battery) 8 for energizing these current consuming elements, whereas in the other rotational position of the cover 4 the knob 17 is out of contact with the switch 12. The switch 12 is thus biased or positioned at a first condition to interrupt the supply of power from the power source to the current consuming elements (the processor, the thermistor and the light emitting diodes) and is movable to a second condition through engagement of the switch 12 with a portion of the housing (i.e., the knob 17 on the cover 4) to balance the biasing effect and cause power to be supplied from the power supply to the current consuming elements. The knob 17 and cover 4 thus form a mechanism for changing the switch member 12 between the first condition and the second condition. The rotational movement of the cover required for turning on and turning off the device can be, for example, 90 degrees or less. An O-ring seal 18 is positioned between the housing I and the cover 4 for protecting the interior of the housing from moisture and dirt.

After being turned on, the battery 8 will continue to deliver drive current to the current consuming elements for as long as the switch is kept in this position or condition. However, the switch 12 is biased by a spring load or the like towards the closed position or closed condition, and will therefore switch off the current supply to the current consuming elements if the cover 4 is turned in the opposite direction so that the knob 17 on the cover 4 is moved away from the switch 12. It is thus possible to switch on and switch off the device by simply rotating the cover 4.

The function and operation of the device of the present invention is as follows. In use, the fitting 2 of the device is fitted or connected to an object whose temperature is to be monitored, e.g., bearing housing. This can be accomplished by screwing the threaded portion 3 of the fitting 2 into a threaded bore in the object so that the fitting is in heat conducting or heat transferring contact with the object. The drawing FIGURE illustrates an object 20 having a threaded bore 21 for receiving the threaded portion 3 of the fitting 2.

When the monitoring work or operation is to begin, the cover 4 is turned by an appropriate amount in the appropriate direction (for example 90° in the clockwise direction) so that the cover 4, at the end of this rotation, will be positioned such that the knob 17 presses on the switch 12. The current consuming elements will thus be energized or supplied with power from the battery or other appropriate power source 8.

The current supplied from the battery 8 causes the thermistor 13 to begin metering or monitoring the temperature of the bar shaped portion 14. The processor causes one or both of the light emitting diodes 9, 10 to flash, thereby indicating that the device is active. This can for instance be shown as two short flashes of a green light emitting diode followed by one short flash of a red light emitting diode.

The thermistor then begins to meter or monitor the temperature, and this can be shown by an appropriate signal from one or more of the light emitting diodes, for example the green light flashing, e.g. once every 60 seconds.

The temperature in the object is sensed over an extended period of time, e.g., two hours, when the object is supposed to have reached its steady-state temperature or normal operating temperature, whereupon the processor records or stores such temperature of the object. The processor then causes an appropriate signal to be emitted from one or more of the light emitting diodes. This can involve the green light emitting diode beginning flashing, e.g. once every 30 seconds. This is the normal operating condition for the device, and this condition is maintained as long as the temperature of the object remains within a specified range from the temperature recorded or stored as the normal condition temperature.

If however the temperature should rise above a predetermined lever, for example 10° C. above this normal condition temperature, the processor causes an appropriate signal to be issued from one or more of the light emitting diodes to thus indicate an abnormal temperature condition or error condition. This can involve, for example, the red light emitting diode starting to flash, e.g., three times for every 30 seconds. The operator is thus appropriately informed of the existence of an error condition or abnormal temperature condition with the object.

The operator then controls the cause of the error condition and takes the necessary steps for removing the error. When this is done successfully and the temperature again drops to the normal condition, the red light emitting diode is turned off and the green light emitting diode resumes its flashing condition, for example once every 30 seconds, thereby indicating a normal temperature condition for the object being monitored.

If the normal operating temperature for the object increases for some reason, e.g., through an exchange or replacement of components incorporated in the object, such as bearings or the like, the cover 4 is rotated in the direction opposite to the direction in which the cover was rotated to render the device operational (e.g., counter-clockwise). The knob 17 of the cover 4 will thus move away from the switch 12 to interrupt the power supply from the battery 8 to the current consuming elements, thus causing the temperature monitoring device to become inactive.

After a rest period, e.g. 30 minutes, the cover 4 is again turned in the appropriate direction (e.g., clockwise) to initiate the operational state of the device, whereupon the same procedure as that described above is resumed. However, after the first "normalizing" time period of, for example, two hours, the device starts to function in the normal state, but at a higher basic temperature.

It is thus possible to use the same or exactly similar devices in accordance with the invention for objects where changing normal temperature conditions occur, and also for applications having rather different basic normal temperature ranges, as the device of the present invention does not control or indicate if the object being monitored exceeds a certain numerical temperature value, but instead controls or monitors if the object undergoes a temperature increase from an arbitrary temperature level exceeding a certain temperature range, e.g., 10° C.

The fitting 2 with its threaded portion 3 and its rod shaped or flat surface portion 14 are preferably made from brass or another appropriate material having good temperature conducting properties. The frame 7 and the housing 1 can be manufactured from any suitable material that is sufficiently robust to withstand rough handling during use. These materials include plastic materials, such as polycarbonate.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A temperature monitoring device for continuously monitoring the temperature of an object, comprising:

a housing that includes contact means engageable with the object for producing heat transferring contact with the object;

indicating means for outputting an indication of a temperature condition of the object;

a sensing member positioned in heat transferring contact with said contact means to emit a signal representative of a current temperature of the object;

a control device connected to said sensing member to receive the signal from the sensing member representative of the current temperature of the object and to emit a signal to the indicating means to output the indication of the temperature condition of the object;

power supply means for supplying power to the control device, the sensing member and the indicating means;

switch means urged to a first condition interrupting the supply of power from the power supply means to the control device, the sensing member and the indicating means, and movable into a second condition causing the power supply means to supply power to the control device, the sensing member and the indicating means; and a portion of the housing being movable between a first position in which the switch means is urged to said first condition and a second position in which the portion of the housing contacts the switch means to cause the power supply means to supply power to the control device, the sensing member and the indicating means.

2. The temperature monitoring device according to claim 1, wherein the sensing member and the switch means are rigidly interconnected.

3. The temperature monitoring device according claim 1, including a frame which carries the sensing member, the control device, the indicating means, the power supply means and the switch means.

4. The temperature monitoring device according claim 3, wherein the housing includes an interior and the frame is positioned within the interior of the housing.

5. The temperature monitoring device according claim 4, wherein the housing possesses an elongated tubular shape and at least one transparent portion, said contact means being positioned at one axial end of the housing, said indicating means being positioned to be visually observed through the at least one transparent portion of the housing.

6. The temperature monitoring device according to claim 1, wherein the contact means is located at one end of the housing and including a cover rotatably mounted at an opposite end of the housing, the portion of the housing which is movable between the first and second positions being a knob extending from the cover.

7. The temperature monitoring device according to claim 1, wherein the control device emits a first signal for activating the indicating means when a monitoring period is started following contact of the sensing member with the contact means and movement of the switch means to the second condition.

8. The temperature monitoring device according claim 7, wherein the control device has a delay function allowing self-adjustment of a temperature level during an extended period of time, the control device emitting to the indicating means a second signal causing the indicating means to indicate a steady state temperature condition, the control device emitting to the indicating means a third signal upon an occurrence of a temperature rise in the object that exceeds a predetermined level causing the indicating means to indicate an abnormal temperature increase condition.

9. The temperature monitoring device according claim 8, wherein the control device is a processor programmed to emit the second signal after a predetermined time delay and to emit the third signal when the sensing member senses a temperature rise of the object that exceeds the predetermined temperature level.

10. The temperature monitoring device according to claim 1, wherein the indicating means include two light emitting diodes.

11. The temperature monitoring device according to claim 10, wherein the two light emitting diodes are different colors.

12. The temperature monitoring device according to claim 11, including a frame which carries the sensing member, the control device, the indicating means, the power supply means and the switch means, the power supply means being a battery provided on the frame that is connected by way of the switch member to the sensing member, the control device and the indicating means.

13. The temperature monitoring device according to claim 1, wherein the sensing member is a thermistor.

14. A temperature monitoring device for continuously monitoring the temperature of an object, comprising:
   a housing adapted to be connected to the object;
   a sensing member sensing a current temperature of the object by way of heat transfer when the housing is connected to the object and emitting a signal representative of the current temperature of the object;
   indicating means mounted on the housing for outputting an indication of a temperature condition of the object;
   a processor connected to said sensing member to receive the signal from the sensing member representative of the current temperature of the object and to emit a signal to the indicating means to output the indication of the temperature condition of the object;
   a power supply to supply power to the processor, the sensing member and the indicating means;
   a switch changeable between a first condition in which power from the power supply to the processor, the sensing member and the indicating means is interrupted, and a second condition in which power is supplied from the power supply to the processor, the sensing member and the indicating means; and
   means for changing the switch between the first condition and the second condition.

15. The temperature monitoring device according claim 14, including a frame which carries the sensing member, the processor, the indicating means, the power supply and the switch.

16. The temperature monitoring device according claim 15, wherein the housing includes an interior and the frame is positioned within the interior of the housing.

17. The temperature monitoring device according claim 14, wherein the housing possesses at least one transparent portion, said indicating means being positioned to be visually observed through the at least one transparent portion of the housing.

18. The temperature monitoring device according to claim 14, wherein the means for changing the switch between the first condition and the second condition includes a cover rotatably mounted on the housing and a knob extending from the cover, the knob being movable upon rotation of the cover between one position in which the knob is out of engagement with the switch so that the switch is in the first condition and another position in which the knob engages the switch change the switch to the second condition.

19. The temperature monitoring device according to claim 14, wherein the indicating means include two differently colored light emitting diodes.

20. The temperature monitoring device according to claim 14, wherein the sensing member is a thermistor.

21. A temperature monitoring device for continuously monitoring the temperature of an object, comprising:
   a housing adapted to be removably connected to the object, the housing including a contact portion to contact the object in a heat transfer manner;
   a sensing member mounted on the housing in heat transferring contact with the contact portion of the housing to sense a current temperature of the object by way of heat transfer when the housing is connected to the object and emitting a signal representative of the current temperature of the object;
   indicating means mounted on the housing for producing an output indicating a temperature condition of the object;
   a processor connected to the sensing member and the indicating means to receive the signal from the sensing member representative of the current temperature of the object and to emit a signal to the indicating means causing the indicating means to produce at least a first output indicating the temperature condition of the object, the processor determining a normal operating condition temperature of the object when a steady-state temperature of the object sensed by the sensing member has been reached and determining an abnormal operating condition temperature of the object when the temperature of the object sensed by the sensing member is outside a predetermined range from the normal operating condition temperature, the processor emitting a signal to the indicating means upon determining the abnormal operating condition temperature of the object so that the indicating means produces the first output indicating the abnormal operating condition temperature of the object; and a power supply to supply power to the processor, the sensing member and the indicating means.

22. The temperature monitoring device according claim 21, including a frame which carries the sensing member, the processor, the indicating means and the power supply.

23. The temperature monitoring device according claim 22, wherein the housing includes an interior and the frame is removably positioned within the interior of the housing.

24. The temperature monitoring device according claim 22, wherein the sensor member is a thermistor.

25. The temperature monitoring device according claim 21, wherein the housing possesses at least one transparent portion, said indicating means being positioned to be visually observed through the at least one transparent portion of the housing.

26. The temperature monitoring device according to claim 21, wherein the housing includes a cover rotatably mounted at one end of the housing, the cover including a knob, and including a switch to control the supply of power to the processor, the sensing member and the indicating means, the knob being movable into and out of engagement with the switch upon rotation of the cover.

27. The temperature monitoring device according claim 21, wherein the processor emits a signal to the indicating means when the processor determines the normal operating condition temperature of the object, with the indicating means producing a second output different from the first output to indicate the normal operating condition temperature of the object.

* * * * *